US012786616B2

(12) United States Patent
Hayakawa

(10) Patent No.: US 12,786,616 B2
(45) Date of Patent: Nov. 3, 2026

(54) SOUND GENERATOR

(71) Applicant: DENSO ELECTRONICS CORPORATION, Anjo-city (JP)

(72) Inventor: Koshiro Hayakawa, Anjo-city (JP)

(73) Assignee: DENSO ELECTRONICS CORPORATION, Anjo-city (JP)

( * ) Notice: Subject to any disclaimer, the term of this patent is extended or adjusted under 35 U.S.C. 154(b) by 137 days.

(21) Appl. No.: 18/798,994

(22) Filed: Aug. 9, 2024

(65) Prior Publication Data

US 2024/0406615 A1 Dec. 5, 2024

Related U.S. Application Data

(63) Continuation of application No. PCT/JP2023/007409, filed on Feb. 28, 2023.

(30) Foreign Application Priority Data

Mar. 7, 2022 (JP) ................................ 2022-034433

(51) Int. Cl.
*H04R 1/28* (2006.01)
*H04R 1/02* (2006.01)

(52) U.S. Cl.
CPC ........... *H04R 1/2811* (2013.01); *H04R 1/023* (2013.01); *H04R 1/025* (2013.01)

(58) Field of Classification Search
CPC ....... H04R 1/023; H04R 1/025; H04R 1/2811
See application file for complete search history.

(56) References Cited

U.S. PATENT DOCUMENTS

2012/0328146 A1* 12/2012 Tsuruta .................... G10K 9/22 381/389
2013/0187523 A1* 7/2013 Miyata .................. A47B 96/00 312/229
2013/0189918 A1* 7/2013 Miyata .................. B60Q 1/007 454/254
2017/0134847 A1* 5/2017 Miyata ................ H04R 1/2826
2019/0313192 A1 10/2019 Miyata et al.
2020/0154211 A1* 5/2020 Miyata .................... H04R 9/06

FOREIGN PATENT DOCUMENTS

JP H01105293 U 7/1989
JP 2018121249 A 8/2018

* cited by examiner

*Primary Examiner* — Paul W Huber
(74) *Attorney, Agent, or Firm* — Harness, Dickey & Pierce, P.L.C.

(57) ABSTRACT

A sound generator includes a sound generating body that generates sound, and a housing that houses the sound generating body. The housing includes a base having a base outer cylindrical portion and a partition wall, which is joined with a sound generating body, provided inside the base outer cylindrical portion, a cover that covers an opening on a front side of the base outer cylindrical portion, and a case that covers an opening on a rear side of the base outer cylindrical portion. The case includes a case rear portion arranged to face the opening of the base outer cylindrical portion, and a case width adjustment portion provided in an extending manner from the case rear portion. The case is joined to the base outer cylindrical portion at an end of the case width adjustment portion.

9 Claims, 5 Drawing Sheets

SOUND GENERATOR

CROSS REFERENCE TO RELATED APPLICATION

The present application is a continuation application of International Patent Application No. PCT/JP2023/007409 filed on Feb. 28, 2023, which designated the U.S. and is based on and claims the benefit of priority from Japanese Patent Application No. 2022-34433 filed on Mar. 7, 2022, the contents of which are incorporated herein by reference.

TECHNICAL FIELD

The present disclosure relates to a sound generator.

BACKGROUND

A sound generator may be used as a vehicle alarm, a vehicle approach notification device, and the like.

SUMMARY

In the sound generator, it is required to generate sound efficiently. The sound generator is required to generate sound with required acoustic characteristics. In the above aspects, or in other aspects not mentioned, there is a need for further improvements in a sound generator.

According to one aspect of the present disclosure, a sound generator comprising: a sound generating body that generates sound; and a housing that houses the sound generating body, wherein the housing includes a base having a base outer cylindrical portion and a partition wall, which is joined with a sound generating body, provided inside the base outer cylindrical portion, a cover that covers an opening on a front side of the base outer cylindrical portion, and a case that covers an opening on a rear side of the base outer cylindrical portion, and wherein the case includes a case rear portion arranged to face the opening of the base outer cylindrical portion, and a case width adjustment portion provided in an extending manner from the case rear portion, and is joined to the base outer cylindrical portion at an end portion of the case width adjustment portion.

In this way, by shaping the case on the rear of the base so that it has a case width adjustment portion between the case rear portion and the base, it is possible to change a size of the space formed between the base and the case simply by changing the width of the case width adjustment portion, thereby it is possible to change the acoustic characteristics of the sound generator. Therefore, it makes it easier to adjust the acoustic characteristics of the sound generator.

In another aspect, the case width adjustment portion is configured as an integral member with the case rear portion.

According to this, it is possible to reduce the manufacturing costs of the case compared to the case in which the case width adjustment portion and the case rear portion are configured as separate members.

In another aspect, the case width adjustment portion is configured as a separate member from the case rear portion.

This makes it easier to adjust the size of the space formed between the base and the case, compared to when the case width adjustment portion and the case rear portion are integrally formed.

In another aspect, the cover includes a cover front portion arranged to face an opening of the base outer cylindrical portion, and a cover width adjustment portion provided in an extending manner from the cover front portion, and is joined to the base outer cylindrical portion at an end portion of the cover width adjustment portion.

In this way, by shaping the cover on the front of the base so that it has a cover width adjustment portion between the front portion of the cover and the base, it is possible to change the size of the space formed between the base and the cover simply by changing the width of the cover width adjustment portion, thereby it is possible to change the acoustic characteristics of the sound generator. Therefore, it makes it easier to adjust the acoustic characteristics of the sound generator.

According to one aspect of the present disclosure, a sound generator comprising: a sound generating body that generates sound; and a housing that houses the sound generating body, wherein the housing includes a base having a base outer cylindrical portion and a partition wall, which is joined with a sound generating body, provided inside the base outer cylindrical portion, a cover that covers an opening on a front side of the base outer cylindrical portion, and a case that covers an opening on a rear side of the base outer cylindrical portion, and wherein the case includes a case rear portion arranged to face the opening of the base outer cylindrical portion, and a case width adjustment portion provided in an extending manner from the case rear portion, and is joined to the base outer cylindrical portion at an end portion of the case width adjustment portion.

In this way, by shaping the cover on the front of the base so that it has a cover width adjustment portion between the front portion of the cover and the base, it is possible to change the size of the space formed between the base and the cover simply by changing the width of the cover width adjustment portion, thereby it is possible to change the acoustic characteristics of the sound generator. Therefore, it makes it easier to adjust the acoustic characteristics of the sound generator.

In another aspect, the cover width adjustment portion is configured as an integral member with the cover front portion.

According to this, it is possible to reduce the manufacturing costs of the cover compared to the case in which the cover width adjustment portion and the cover front portion are configured as separate members.

In another aspect, the cover width adjustment portion is configured as a separate member from the cover front portion.

This makes it easier to adjust the size of the space formed between the base and the cover, compared to when the cover width adjustment portion and the cover front portion are integrally formed.

In another aspect, the cover front portion is provided with one or more cover inner cylindrical portion provided in an extending manner toward the inside of the housing, and a resonance chamber is formed inside the housing by the cover inner cylindrical portion.

By providing the cover width adjustment portion, it becomes possible to form such the cover inner cylindrical portion, and the resonance chamber is further formed in the space formed between the base and the cover, thereby it is possible to amplify sound pressure over a wide frequency band.

In another aspect, the cover inner cylindrical portion is formed to face the base inner cylindrical portion formed in the base, and the cover inner cylindrical portion and the base inner cylindrical portion form a resonance chamber.

According to this, a sound pressure of the sound generated by the sound generating body is amplified by the resonance chamber, and the acoustic characteristics of the sound generator is improved.

In another aspect, the cover inner cylindrical portion is formed to face the base inner cylindrical portion formed in the base, and the cover inner cylindrical portion and the base inner cylindrical portion form a resonance chamber.

According to this, a sound pressure of the sound generated by the sound generating body is amplified by the resonance chamber, and the acoustic characteristics of the sound generator is improved.

In another aspect, the partition wall has at least one of an inner side and an outer side of a portion to which the sound generating body is joined is the same shape as the portion to which the sound generating body is joined.

According to this, it is possible to assemble one of a plurality of sound generating bodies having different diameters to the partition wall of the same shape. Therefore, it makes it easier to adjust the acoustic characteristics of the sound generator.

In another aspect, the sound generator comprises a sound generating body that generates sound, and a housing that houses the sound generating body, wherein the housing includes a base having a base outer cylindrical portion and a partition wall, which is joined with the sound generating body, provided inside the base outer cylindrical portion, a cover that covers an opening on a front side of the base outer cylindrical portion, and a case that covers an opening on a rear side of the base outer cylindrical portion, and wherein the partition wall has at least one of an inner side and an outer side of a portion to which the sound generating body is joined is the same shape as the portion to which the sound generating body is joined.

According to this, it is possible to assemble one of a plurality of sound generating bodies having different diameters to the partition wall of the same shape. Therefore, it makes it easier to adjust the acoustic characteristics of the sound generator.

In another aspect, the partition wall has a groove portion which has a shape corresponding to an end portion of the sound generating body and is joined to the sound generating body, and wherein the partition wall has a further groove which is formed on at least one of an inside and outside of the groove and has the same shape as the groove.

According to this, it is possible to assemble one of a plurality of sound generating bodies having different diameters to the partition wall of the same shape. Therefore, it makes it easier to adjust the acoustic characteristics of the sound generator.

In another aspect, the sound generating body has an end portion in a tapered shape, and wherein the partition wall is joined to the sound generating body at a tapered portion with a shape corresponding to an end portion of the sound generating body, and wherein the partition wall has a further tapered portion which is formed on at least one of an inside and outside of the tapered portion and has the same shape as the tapered portion.

According to this, it is possible to assemble sound generating bodies of various diameters, and the acoustic characteristics of the sound generator can be finely adjusted.

A reference numeral in parentheses attached to each component or the like indicates an example of correspondence between the component or the like and specific component or the like described in embodiments below.

DETAILED DESCRIPTION

Figure 1A:
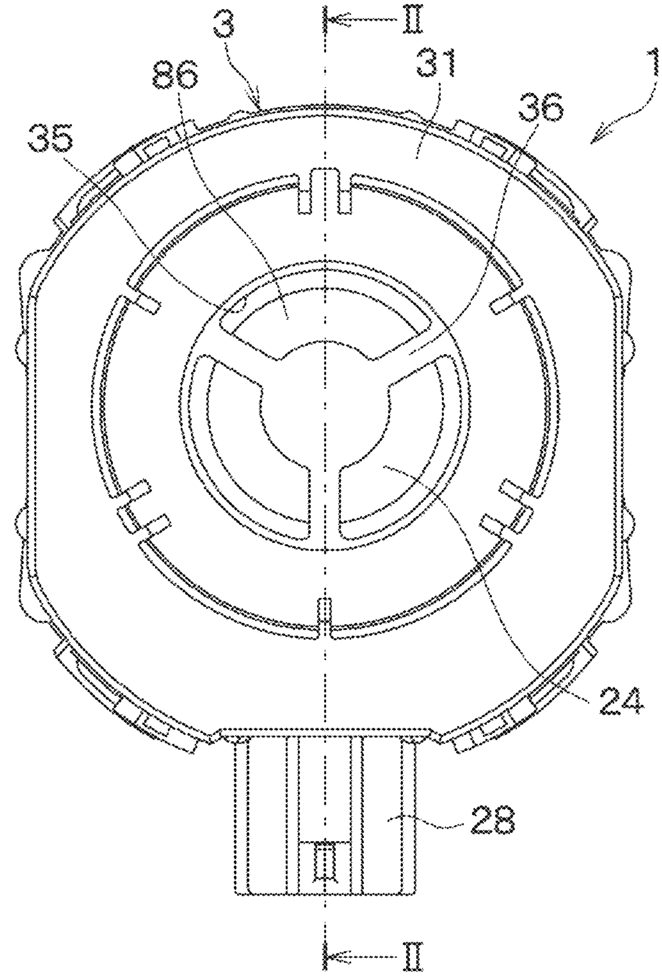
FIG. 1A is a front view showing an entire configuration of a sound generator according to a first embodiment.
Figure 1B:
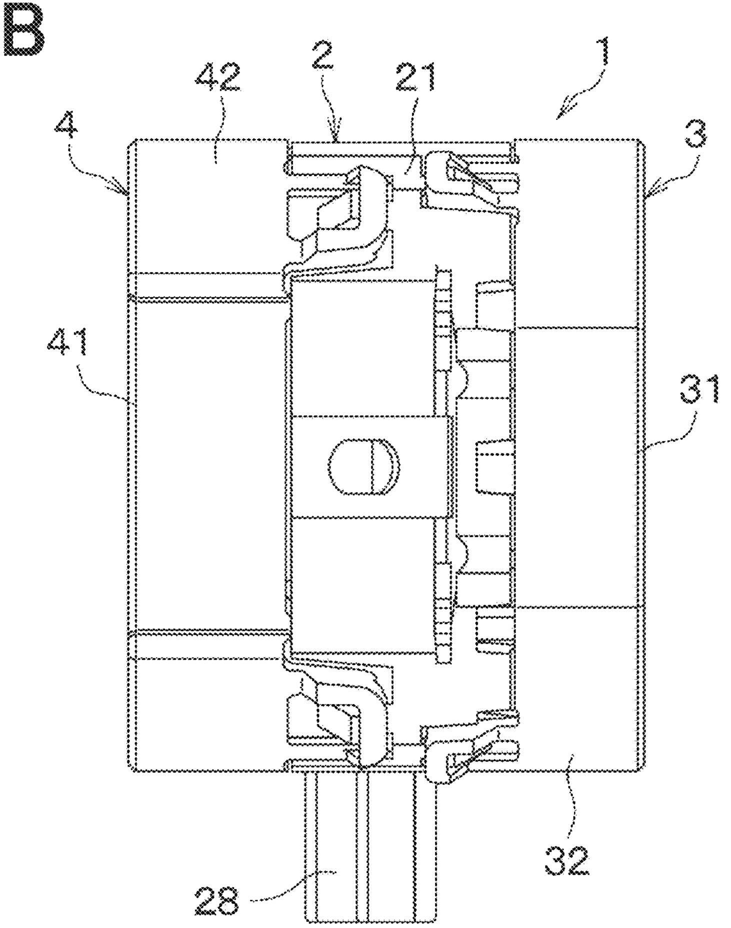
FIG. 1B is a left-side view showing an entire configuration of the sound generator according to the first embodiment.
Figure 1C:
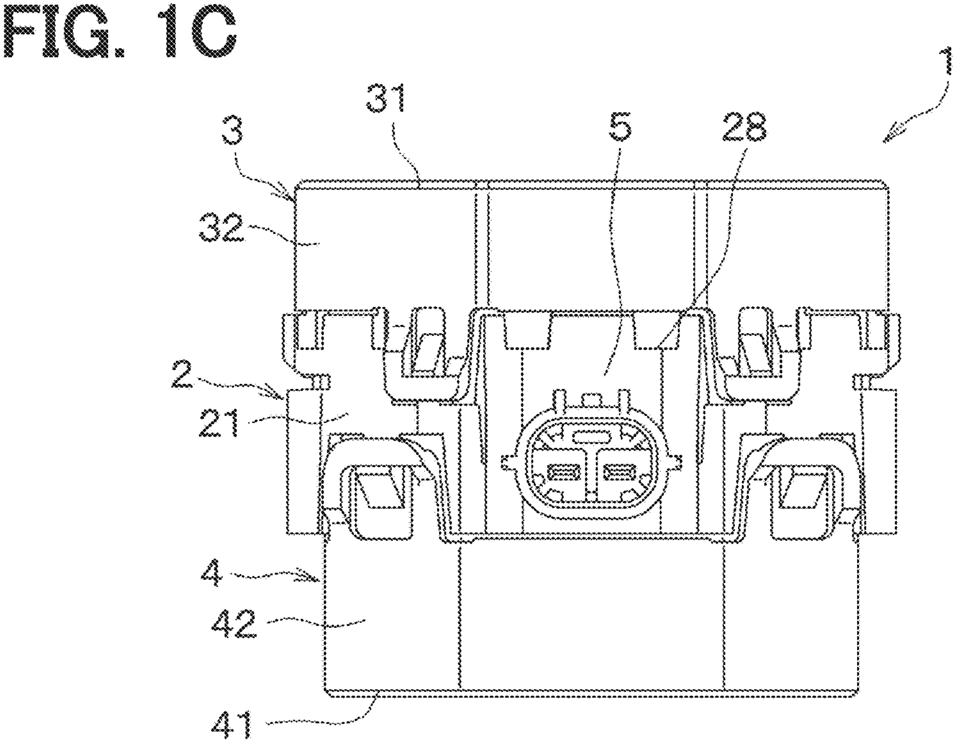
FIG. 1C is a bottom view showing an entire configuration of the sound generator according to the first embodiment.

Hereinafter, embodiments of the present disclosure will be described with reference to the drawings. In the following embodiments, the same reference numerals are assigned to portions that are the same or equivalent to each other for description.

As a vehicle sound generator used for a vehicle alarm, a vehicle approach notification device, and the like, for example, there is one described in JP2018-121249A. This sound generator is configured to provide a sound generating body inside a housing made up of a cylindrical base, a case on a rear of the base, and a cover on a front of the base. The acoustic characteristics of such a sound generator are determined by a diameter of the sound generating body, a size of a space formed between the base and the case, a size of a space formed between the base and the cover, and the like.

In a manufacturing process of a sound generator, the base, the case, the cover and the sound generating body are designed to obtain desired acoustic characteristics. Furthermore, if the base, the case, the cover, and the sound generating body are all designed for each of a number of products having different desired acoustic characteristics, it takes a lot of time to adjust the acoustic characteristics. In recent years, the acoustic characteristics desired for sound generators have become more diverse, and in order to quickly manufacture sound generators that meet customer needs, it is necessary to make it easier to adjust the acoustic characteristics.

In view of the above, it is an object of the present disclosure to provide a sound generator whose acoustic characteristics are easily adjustable.

First Embodiment

A first embodiment is described below. A sound generator of the present embodiment is installed, e.g., outside a vehicle compartment of a vehicle and is used to generate an alarm sound.

As shown in FIGS. 1A-1C and 2, the sound generator includes a housing 1 in which a space is formed. The housing 1 is configured with a base 2, a cover 3, and a case 4, each of which is made of resin. Further, the sound generator includes terminals 5, and a sound generating body 6 arranged inside the housing 1.

The base 2 includes a base outer cylindrical portion 21 having a substantially cylindrical shape. The cover 3 is fitted to an opening at a side of one end of the base outer cylindrical portion 21 to cover this opening, and a case 4 is airtightly joined to an opening at a side of the other end of the base outer cylindrical portion 21 by adhesive.

A space in the base cylindrical portion 21 is divided into two parts, i.e., into a front side and a rear side, by a partition wall 22 provided in the base outer cylindrical portion 21.

That is, the inside of the housing 1 is divided into a space defined by the base outer cylindrical portion 21, the partition wall 22, and the cover 3, and a space defined by the base outer cylindrical portion 21, the partition wall 22, and the case 4.

A through hole 23 in a circular shape is formed in the partition wall 22. A frame 61 (described later) is joined to the opening end portion of the through hole 23 in the partition wall 22, and the through hole 23 is closed by the sound generating body 6.

The partition wall 22 has a portion which has the same cross-sectional shape as the portion to which the frame 61 is joined and is on at least one of the inside and outside of the portion of the partition wall 22 to which the frame 61 is joined. Specifically, a groove portion 221 having a circular shape is formed on the rear surface of the partition wall 22 so as to surround the through hole 23. The groove portion 221 has a shape corresponding to an end portion of the frame 61, and the partition wall 22 is joined to the frame 61 at the groove 221. A further groove portion 222 having the same cross-sectional shape and a larger radius than the groove portion 221 is formed outside the groove portion 221, so that a frame having a larger diameter than the frame 61 shown in FIG. 2 can be attached to the outer one of the further groove portion 222.

Figure 3:
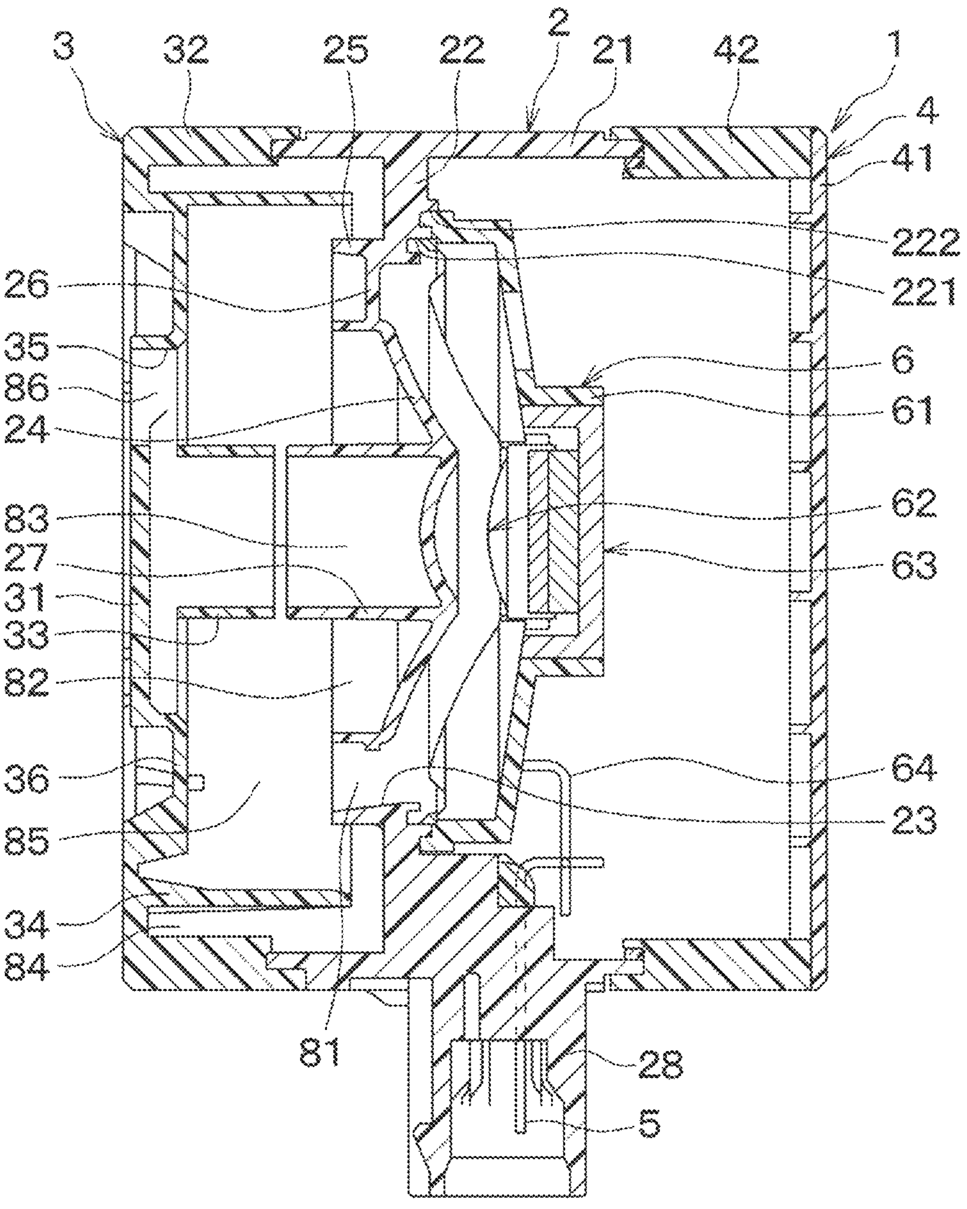
FIG. 3 is a cross-sectional view of a base when a large-diameter sound-generating body is attached to a base.

As shown in FIG. 3, if the frame 61 is joined to the groove portion 222 on the outside, an inside of a portion where the frame 61 is joined among the partition wall 22 provides the portion where the frame 61 is joined and is the same cross-sectional shape. The partition wall 22 may be formed with groove portions more than three. For example, if three groove portions are formed and the frame 61 is joined to the second groove portion from the inside, both the inside one and the outside one of the portion of the partition wall 22 provide portions which is joined with the frame 61 and have the same cross-sectional shape as the portion to which the frame 61 is joined.

Figure 2:
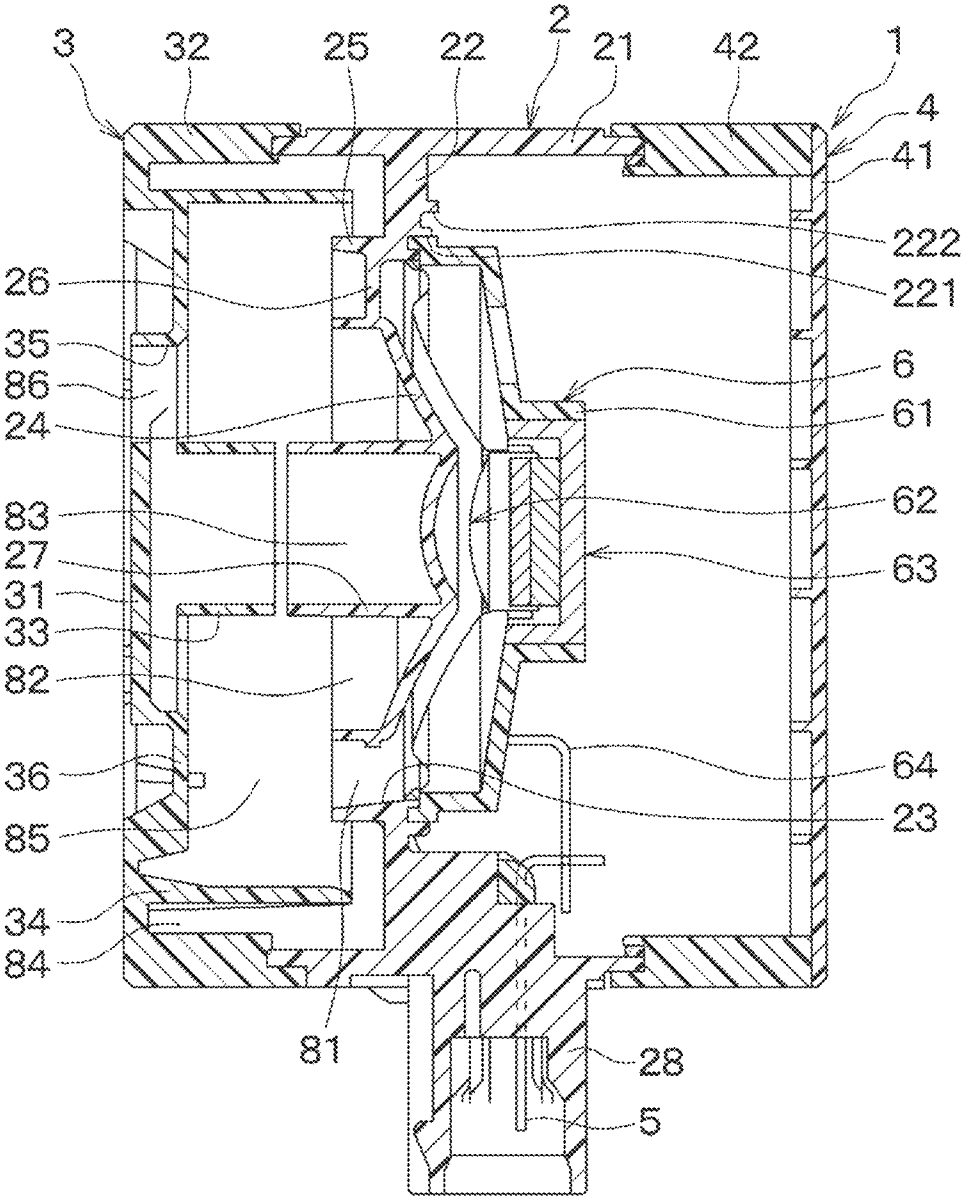
FIG. 2 is a cross-sectional view taken along a line II-II in FIG. 1A.

As shown in FIG. 2, a shielding plate 24 is disposed on a front side of the sound generating body 6. The shielding plate 24 reduces water or the like adhering to a surface of the cover 3 from reaching the sound generating body 6 and prevents breakage of the sound generating body 6 due to the adhesion of water or the like. The shielding plate 24 has an outer peripheral portion and an inner peripheral portion. The outer peripheral portion has a hollow truncated cone shape extending in the front direction. The inner peripheral portion has a dome shape protruding toward in the front direction.

A shielding cylindrical portion 25 in a circular cylindrical shape is formed at the open end portion of the partition wall 22. The shielding cylindrical portion 25 protrudes from an end portion of the partition wall 22 toward a side of the cover 3, and the shielding plate 24 is connected to the shielding cylindrical portion 25 by a plurality of beam portions 26.

A sound generated by the sound generating body 6 travels to an outside of the housing 1 through a space between the shielding plate 24 and the shielding cylindrical portion 25. A passage of sound formed by the shielding plate 24 and the shielding cylindrical portion 25 is referred to as a sound passage 81.

The shielding plate 24 has a configuration for amplifying a sound pressure of a sound having passed through the sound passage 81. Specifically, the shielding plate 24 is formed with a base inner cylindrical portion 27 in a cylindrical shape that protrudes from the outer edge of the inner periphery toward the cover 3. The outer peripheral portion of the shielding plate 24, the base inner cylindrical portion 27, and the cover 3 define a resonance chamber 82. The inner peripheral portion of the shielding plate 24, the base inner cylindrical portion 27, and the cover 3 define a resonance chamber 83. By forming a plurality of resonant chambers in this manner, it is possible to obtain a large sound pressure over a wide frequency band.

The partition wall 22 has a through hole 23 and a vent hole (not shown) formed at a location away from the sound generating body 6. The vent hole is provided to reduce an occurrence of a pressure difference due to a temperature change between a space defined by the base outer cylindrical portion 21, the partition wall 22, and the cover 3 and a space defined by the base outer cylindrical portion 21, the partition wall 22, and the case 4. This vent is fitted with a permeable membrane that allows air to pass through but blocks water.

As shown in FIG. 1A, FIG. 1B, FIG. 1C and FIG. 2, a connector 28 having a substantially rectangular cylindrical shape is formed on the outside of the base outer cylindrical portion 21. The connector 28 is a member for electrically connecting the sound generating body 6 to an external harness (not shown). The connector 28 is arranged on a lower surface of the base outer cylindrical portion 21 and opens in a downward direction of the housing 1.

Terminals 5 are arranged inside the connector 28. The terminals 5 electrically connects an inside and an outside of the housing 1. The terminals 5 penetrate the side wall of the base outer cylindrical portion 21, and a base in a portion of the terminals 5 exposed from an inner wall surface of the base outer cylindrical portion 21 are covered with an adhesive and fixed to the base outer cylindrical portion 21. The terminals 5 are connected to lead pins 64 which are described later.

The cover 3 includes a cover front portion 31 which has a circular plate shape and is arranged to face an opening of the base outer cylindrical portion 21, and a cover width adjustment portion 32 provided in an extending manner from the cover front portion 31, and is joined to the base outer cylindrical portion 21 at an end of the cover width adjustment portion 32.

The cover width adjustment portion 32 is a member for adjusting the size of the space formed between the base 2 and the cover 3 so as to obtain desired acoustic characteristics. The sound generated by the sound generating body 6 resonates in the space formed between the base 2 and the cover 3, and the sound pressure is amplified and released to the outside of the housing 1. This resonance frequency is determined by a volume of the space, and can be adjust by the width of the cover width adjustment portion 32. In addition, although the cover width adjustment portion 32 is configured as an integral member with the cover front portion 31 in FIG. 2, the cover width adjustment portion 32 may be configured as a separate member from the cover front portion 31.

The cover front portion 31 is formed with a plurality of cover inner cylindrical portions provided in an extending manner toward the inside of the housing 1. Specifically, a cover inner cylindrical portion 33 is formed on an inner periphery of the cover front portion 31 at a position corresponding to the base inner cylindrical portion 27, and the resonance chamber 83 is formed by the inner periphery of the shielding plate 24, the base inner cylindrical portion 27, the cover front portion 31, and the cover inner cylindrical portion 33.

Further, a cover inner cylindrical portion 34 is formed on an outer periphery of the cover front portion 31. The cover inner cylindrical portion 34 is formed outside the shielding cylindrical portion 25 and faces the outer wall surface of the base inner cylindrical portion 27. A resonance chamber 84 is formed by the base outer cylindrical portion 21, the partition wall 22, the cover front portion 31, the cover width adjustment portion 32, and the cover inner cylindrical portion 34. Further, a resonance chamber 85 is formed by the partition wall 22, the shielding cylindrical portion 25, the base inner cylindrical portion 27, the cover front portion 31, the cover inner cylindrical portion 33, and the cover inner cylindrical portion 34. It should be noted that only one of the cover inner cylindrical portion 33 and the cover inner cylindrical portion 34 may be formed.

A through hole 35 in a circular shape is formed in the cover front portion 31 in a portion between the cover inner cylindrical portion 33 and the cover inner cylindrical portion 34. The through hole 35 is a member for discharging a sound whose sound pressure is amplified by the resonance chambers 82 to 85 to the outside of the housing 1 through the sound passage 81.

As shown in FIG. 1A, an inside and an outside of the through hole 35 are connected to each other by beam portions 36. A plurality of beam portions 36 are formed, and the through hole 35 is divided into a plurality of portions by the plurality of beam portions 36. The through hole 35 divided into the plurality of portions form sound emission holes 86 through which the space inside the housing 1 is opened to the outside of the housing 1 and a sound generated by the sound generating body 6 is emitted to the outside.

The case 4 includes a case rear portion 41 which has a circular plate shape and is arranged to face an opening of the base outer cylindrical portion 21, and a case width adjustment portion 42 provided in an extending manner from the case front portion 41, and is joined to the base outer cylindrical portion 21 at an end of the case width adjustment portion 42.

The case width adjustment portion 42 is a member for adjusting the size of the space formed between the base 2 and the case 4 so as to obtain desired acoustic characteristics. The resonance frequency of the sound generating body 6 is determined by factors such as the volume of the space formed between the base 2 and the case 4, and a large sound pressure caused by the resonance is released to the outside of the housing 1. This resonance frequency can be adjusted by the size of the case width adjustment portion 42. In addition, although the case width adjustment portion 42 is configured as a separate member from the case rear portion 41 in FIG. 2, the case width adjustment portion 42 may be configured as an integral member with the case rear portion 41.

As shown in FIG. 2, the sound generating body 6 includes the frame 61, a diaphragm 62, a drive unit 63, and terminal connecting members 64.

The frame 61 is a member to support the diaphragm 62 and the drive unit 63. The frame 61 has a substantially stepped cylindrical shape, and has a larger opening on a front than on a rear of the frame 61. The opening on the front of the frame 61 is closed by the diaphragm 62. The sound generating body 6 is fitted into the groove portion 221 of the partition wall 22 at an opening end portion on a side of the front of the frame 61, and is hermetically joined by adhesion. The frame 61 is made of resin.

The diaphragm 62 has an outer peripheral portion and an inner peripheral portion. The outer peripheral portion has a hollow truncated cone shape extending in the front direction. The inner peripheral portion has a dome shape protruding toward in the front direction. As described above, the shielding plate 24 has the same shape, and the inner peripheral portion and the outer peripheral portion of the shielding plate 24 face the inner peripheral portion and the outer peripheral portion of the diaphragm 62, respectively. The drive unit 63 is connected to a rear of the diaphragm 62.

The drive unit 63 vibrates the diaphragm 62. The driving unit 63 is composed of a bobbin around which a voice coil is wound, and magnetic circuit members that applies a magnetic field to the voice coil. The bobbin has a cylindrical shape and is joined to an outline of the inner peripheral portion of the diaphragm 62. The magnetic circuit members include a yoke, a magnet, and a top plate. The yoke has a bottomed cylindrical shape. The magnet has a disk shape, and is arranged on an inner bottom surface of the yoke. The top plate has a disk shape, and is laminated on the magnet.

The yoke and the top plate are made of a magnetic material. The yoke opens toward the diaphragm 62 and is arranged so as to close the opening on a side of the rear of the frame 61. A gap is formed between the magnet, the top plate, and a side wall of the yoke. The voice coil is arranged in the gap. Thus, a magnetic field generated between the top plate and the side wall of the yoke is applied to the voice coil. By applying an electric current to the voice coil in this state, the bobbin moves in an axial direction, the diaphragm 62 vibrates, and a sound is generated. The voice coil is connected to the terminals 5 by lead wires and the terminal connecting members 64.

Such a sound generator is disposed on an outside of a vehicle compartment, more specifically, is disposed within a front bumper of the vehicle, so that the cover 3 is located on a front side rather than the case 2. When electricity is applied to the voice coil of the sound generating body 6, the diaphragm 62 vibrates to produce sound. The sound emitted by the sound generating body 6 passes through the gap formed between the shielding plate 24 and the diaphragm 62 and through the sound passage 81, and the sound pressure is amplified by the resonance chambers 82 to 85, and is released to the outside of the housing 1 through the sound emission hole 86.

The effect of this embodiment is described. In this embodiment, the case 4 has a case rear portion 41 arranged to face the opening of the base outer cylindrical portion 21, and a case width adjustment portion 42 provided in an extending manner from the case rear portion 41, and is joined to the base outer cylindrical portion 21 at the end of the case width adjustment portion 42.

In this way, the size of the space formed between the base 2 and the case 4 can be changed by simply changing the width of the case width adjustment portion 42 without changing the shapes of the base 2 and the case rear portion 41, thereby it is possible to change the acoustic characteristics of the sound generator. Therefore, it makes it easier to adjust the acoustic characteristics of the sound generator and it is possible to reduce the manufacturing costs of the sound generator.

In this embodiment, the cover 3 includes a cover front portion 31 arranged to face an opening of the base outer cylindrical portion 21, and a cover width adjustment portion 32 provided in an extending manner from the cover front portion 31, and is joined to the base outer cylindrical portion 21 at an end of the cover width adjustment portion 32.

In this way, the size of the space formed between the base 2 and the cover 3 can be changed by simply changing the width of the cover width adjustment portion 32 without changing the shapes of the base 2 and the case front portion 31, thereby it is possible to change the acoustic characteristics of the sound generator. Therefore, it makes it easier to adjust the acoustic characteristics of the sound generator and it is possible to reduce the manufacturing costs of the sound generator.

In this embodiment, the partition wall 22 has at least one of an inner side and an outer side of a portion to which the sound generating body 6 is joined is the same shape as the portion to which the sound generating body 6 is joined.

According to this, it is possible to assemble a plurality of frames 61 having different diameters with the partition wall 22 without changing the shape of the partition wall 22 and the shape of the end portion of the frame 61. Therefore, it makes it easier to adjust the acoustic characteristics of the sound generator and it is possible to reduce the manufacturing costs of the sound generator.

Further, according to the embodiments described above, it is possible to achieve the following advantageous effects.

(1) If the case width adjustment portion 42 is configured as an integral member with the case rear portion 41, it is possible to reduce the manufacturing costs of the case 4 compared to the case in which these are configured as a separate member.

(2) If the case width adjustment portion 42 is configured as a separate member from the case rear portion 41, it is easier to adjust the size of the space formed between the base 2 and the case 4 than the case in which these are configured as an integral member.

(3) If the cover width adjustment portion 32 is configured as an integral member with the cover front portion 31, it is possible to reduce the manufacturing costs of the cover 3 compared to the case in which these are configured as a separate member.

(4) If the cover width adjustment portion 32 is configured as a separate member from the cover front portion 31, it is easier to adjust the size of the space formed between the base 2 and the cover 3 than the case in which these are configured as an integral member.

(5) The cover front portion 31 is provided with one or more cover inner cylindrical portion provided in an extending manner toward the inside of the housing 1, and a resonance chamber is formed inside the housing 1 by the cover inner cylindrical portion. By providing the cover width adjustment portion 32, it becomes possible to form such the cover inner cylindrical portion, and the resonance chamber is further formed in the space formed between the base 2 and the cover 3, thereby it is possible to amplify sound pressure over a wide frequency band.

(6) The cylindrical portion 33 is formed to face the base inner cylindrical portion 27, and the cylindrical portion 33 and the base inner cylindrical portion 27 form the resonance chamber 83. According to this, a sound pressure of the sound generated by the sound generating body 6 is amplified by the resonance chamber 83, and the acoustic characteristics of the sound generator is improved.

(7) The cylindrical portion 34 is formed to face the outer wall surface of the base inner cylindrical portion 27, and the cover inner cylindrical portion 27 and the cylindrical portion 34 form the resonance chamber 86. According to this, a sound pressure of the sound generated by the sound generating body 6 is amplified by the resonance chamber 86, and the acoustic characteristics of the sound generator is improved.

(8) The partition wall 22 has a groove portion which has a shape corresponding to an end portion of the frame 61 and is joined to the frame 61, and further has a further groove which is formed on at least one of an inside and outside of the groove and has the same cross-sectional shape as the groove. According to this, it is possible to assemble a plurality of frames 61 having different diameters with the partition wall 22 without changing the shape of the partition wall 22 and the shape of the end portion of the frame 61. Therefore, it makes it easier to adjust the acoustic characteristics of the sound generator.

Second Embodiment

A second embodiment is described. The second embodiment is different from the first embodiment in shapes of the partition wall 22 and the frame 61. Other portions are similar to those of the first embodiment, and thus portions different from the first embodiment is mainly described.

Figure 4:
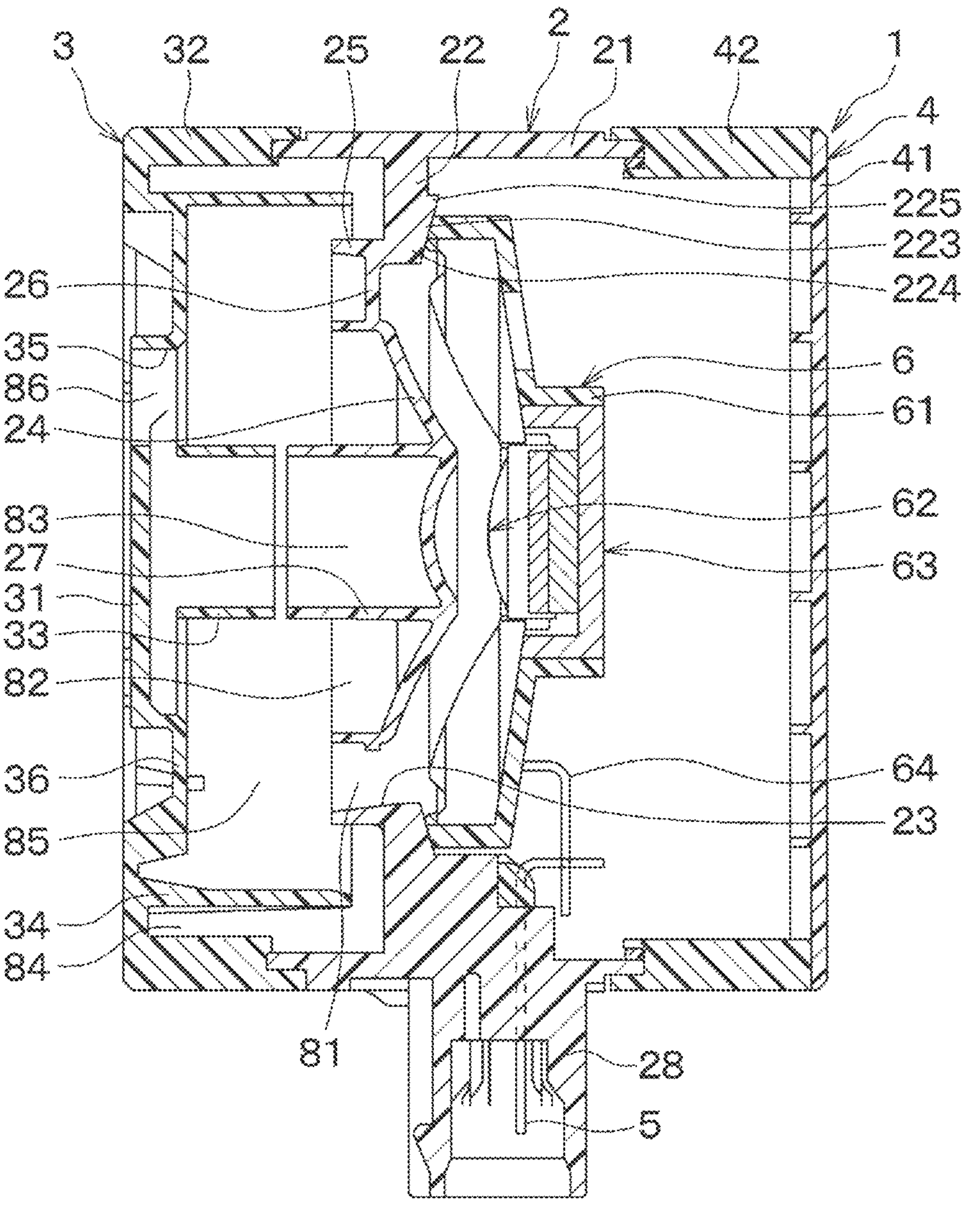
FIG. 4 is a cross-sectional view of a sound generator according to a second embodiment.

As shown in FIG. 4, in this embodiment, an end portion of the frame 61 is formed in a tapered shape. The partition wall 22 is joined to the frame 61 at a tapered portion 223 having a shape corresponding to the end portion of the frame 61. On the inner and outer sides of the tapered portion 223 of the partition wall 22, further tapered portions 224, and 225 having the same cross-sectional shape as the tapered portion 223 to which the frame 61 is joined are formed.

In addition, a tapered portion having the same cross-sectional shape as the tapered portion 223 to which the frame 61 is joined may be formed, among the partition wall 22, on only one of the inside and outside of the tapered portion 223 to which the frame 61 is joined.

The present embodiment can achieve the same effects as those of the first embodiment from the same configuration and operation as those of the first embodiment.

Further, according to the embodiments described above, it is possible to achieve the following advantageous effects.

(1) The partition wall 22 is joined to the frame 61 at tapered portion 223 having a shape corresponding to the end of the frame 61, and a tapered portion having the same cross-sectional shape as the tapered portion 223 is formed on at least one of the inside and the outside of the tapered portion 223. According to this, the partition wall 22 can be used to be joined with the frames 61 of various diameters, it is possible to finely adjust the acoustic characteristics of the sound generator.

Other Embodiments

The present disclosure is not limited to the above-described embodiments, and can be appropriately modified. Individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Furthermore, a shape, positional relationship or the like of a structural element, which is referred to in the embodiments described above, is not limited to such a shape, positional relationship or the like, unless it is specifically described or obviously necessary to be limited in principle.

What is claimed is:

1. A sound generator comprising:

a sound generating body that generates sound; and a housing that houses the sound generating body, wherein the housing includes a base having a base outer cylindrical portion and a partition wall, which is joined with the sound generating body, provided inside the base outer cylindrical portion, a cover that covers an opening on a front side of the base outer cylindrical portion, and a case that covers an opening on a rear side of the base outer cylindrical portion, the case includes a case rear portion arranged to face the opening of the base outer cylindrical portion, and a case width adjustment portion provided in an extending manner from the case rear portion, and is joined to the base outer cylindrical portion at an end of the case width adjustment portion, and the case width adjustment portion is configured as a separate member from the case rear portion.

2. The sound generator according to claim 1, wherein the cover includes a cover front portion arranged to face an opening of the base outer cylindrical portion, and a cover width adjustment portion provided in an extending manner from the cover front portion, and is joined to the base outer cylindrical portion at an end of the cover width adjustment portion.

3. The sound generator according to claim 2, wherein the cover front portion includes one or more cover inner cylindrical portions provided in an extending manner toward an inside of the housing, and wherein the one or more cover inner cylindrical portions form a resonance chamber within the housing.

4. The sound generator according to claim 1, wherein the partition wall has at least one of an inner side and an outer side of a portion to which the sound generating body is joined, and the portion is the same shape as a portion to which the sound generating body is joined.

5. A sound generator comprising:

a sound generating body that generates sound; and a housing that houses the sound generating body, wherein the housing includes a base having a base outer cylindrical portion and a partition wall, which is joined with the sound generating body, provided inside the base outer cylindrical portion, a cover that covers an opening on a front side of the base outer cylindrical portion, and a case that covers an opening on a rear side of the base outer cylindrical portion, the cover includes a cover front portion arranged to face the opening of the base outer cylindrical portion, and a cover width adjustment portion provided in an extending manner from the cover front portion, and is joined to the base outer cylindrical portion at an end of the cover width adjustment portion, and the cover width adjustment portion is configured as a separate member from the cover front portion.

6. The sound generator according to claim 5, wherein the cover front portion includes one or more cover inner cylindrical portions provided in an extending manner toward an inside of the housing, and wherein the one or more cover inner cylindrical portions form a resonance chamber within the housing.

7. The sound generator according to claim 6, wherein one of the one or more cover inner cylindrical portions is formed to face a base inner cylindrical portion formed in the base, and wherein the one of the one or more cover inner cylindrical portions and the base inner cylindrical portion form a resonance chamber.

8. The sound generator according to claim 6, wherein the partition wall has at least one of an inner side and an outer side of a portion to which the sound generating body is joined, and the portion is the same shape as a portion to which the sound generating body is joined.

9. A sound generator comprising:

a sound generating body that generates sound; and a housing that houses the sound generating body, wherein the housing includes a base having a base outer cylindrical portion and a partition wall, which is joined with the sound generating body, provided inside the base outer cylindrical portion, a cover that covers an opening on a front side of the base outer cylindrical portion, and a case that covers an opening on a rear side of the base outer cylindrical portion, the partition wall has at least one of an inner side and an outer side of a portion to which the sound generating body is joined, and the portion is the same shape as a portion to which the sound generating body is joined, the sound generating body has an end portion in a tapered shape, the partition wall is joined to the sound generating body at a tapered portion with a shape corresponding to the end portion of the sound generating body, and the partition wall has a further tapered portion which is formed on at least one of an inside and an outside of the tapered portion and has the same shape as the tapered portion.

* * * * *